Patented Feb. 11, 1947

2,415,783

UNITED STATES PATENT OFFICE 2,415,783

HYDRAULIC OPERATOR

Charles H. Bassett, Chicago, and Edmond P. De Craene, Westchester, Ill., assignors to Crane Co., Chicago, Ill., a corporation of Illinois Application May 20, 1944, Serial No. 536,624

5 Claims. (Cl. 60—97)

This invention relates to valve actuating mechanism or the like, and more particularly to improvements in hydraulic operators for imparting reciprocable movement to valve stems, shafts, etc., and is more especially concerned with hydraulic operators embodying booster means for applying an additional force to a stem or shaft through a portion of its stroke.

This invention is particularly suited for use with wedge gate valves, in which the discs thereof have a tendency to stick in the seated position and therefore require a substantially greater force for unseating than is required for seating the same.

This invention further contemplates the provision of a booster means which is simple in operation, inexpensive in construction and which will not readily get out of order.

This invention embodies other novel features, details of construction and arrangement of parts which are hereinafter set forth in the specification and claims and illustrated in the accompanying drawings, forming part thereof, wherein:

Figure 1:
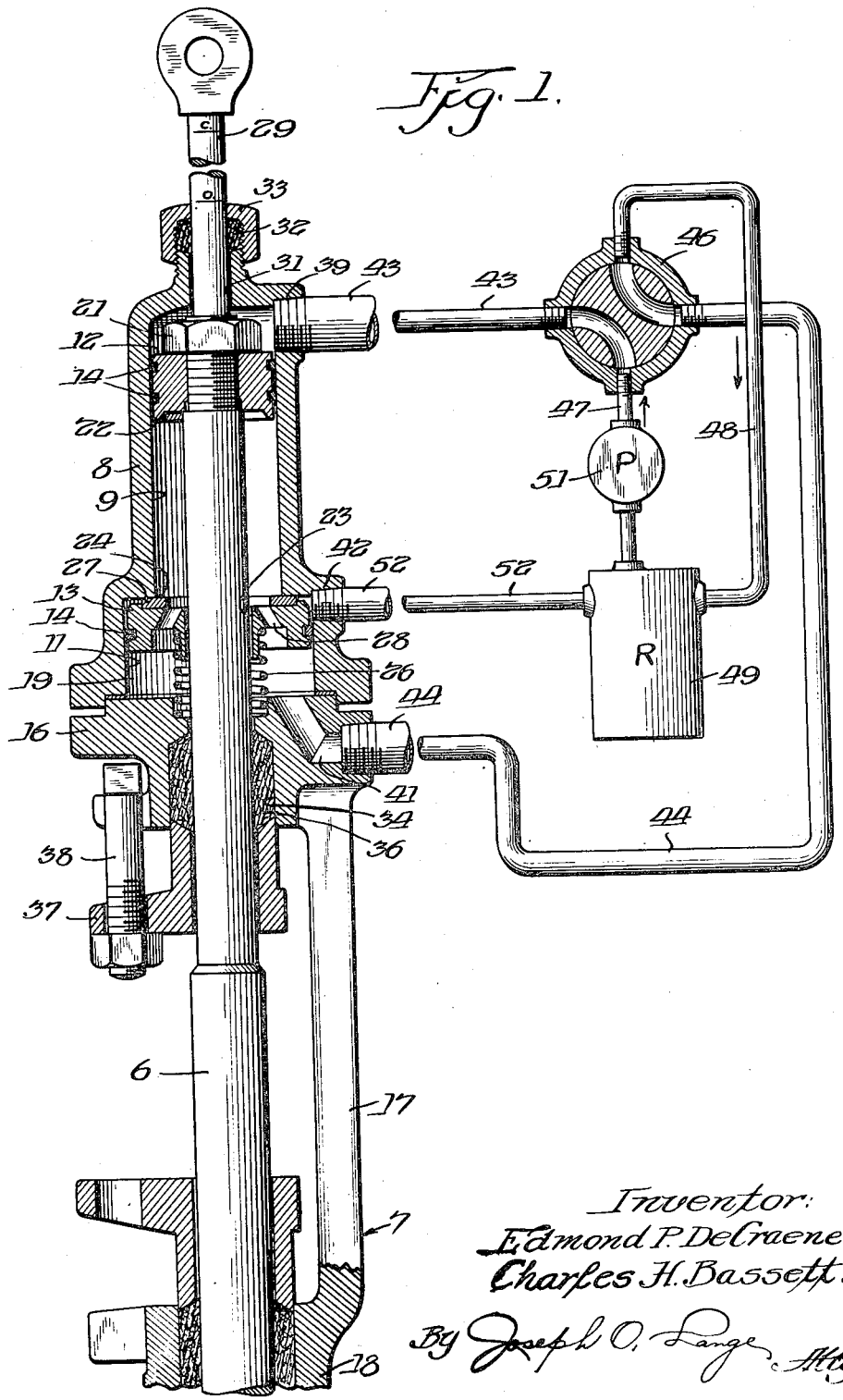
Fig. 1 is a vertical sectional view of a hydraulic operator embodying features of this invention, the several parts being shown as disposed at one end of the piston stroke (valve open).

Referring now to Fig. 1 of the drawings for a better understanding of this invention, a hydraulic operator embodying features of this invention is shown as applied for reciprocating a valve stem 6 of a gate valve 7 having a conventional wedge type disc (not shown).

The hydraulic operator comprises a cylinder 8 having a relatively small diameter bore 9 and a relatively large diameter bore 11 to receive pistons 12 and 13, respectively, having piston rings 14. The cylinder is secured by bolts (not shown) to the upper connecting portion 16 of yoke arms 17 formed on a bonnet 18 to form therewith what is hereinafter referred to as a booster chamber 19.

The piston 12 is secured to the upper end of the stem 6 by a nut 21 and is formed with a depending annular sealing shoulder 22. The piston 13 is provided with an aperture 23 for the insertion therethrough of the stem 6, and with a sealing seat member 24 which may be formed of metal, rubber, leather, or other suitable material. The seat member is secured to the piston 13 by any suitable means such as cement, screws or welding. A helical compression spring 26 or other suitable resilient means is interposed between the booster piston 13 and the portion 16 of the bonnet yoke arms to yieldably resist movement of the piston away from a seating shoulder 27 formed on the cylinder 8. A plurality of apertures 28 are formed in the booster piston 13 to permit free flow of fluid from the booster chamber 19 to that portion of the cylinder under the piston 12.

A sight indicator 29 is secured to the upper end of the stem 6 and projects through an aperture 31 in the cylinder and is sealed against leakage by packing 32 and a gland nut 33. A stuffing box 34 is provided in the yoke portion 16 for the stem 6 and comprises the usual packing 36, gland 37, and gland bolts 38.

Fluid passageways 39 and 41 are provided for the passage of fluid to and from the upper end of the cylinder 8 and the bottom of the booster chamber 19, respectively. A bleeder passageway 42 is provided at the upper end of the booster chamber 19. Conduits 43 and 44 lead from the passageways 39 and 41 to a suitable four-way control valve 46, and conduits 47 and 48 lead from the control valve to a fluid supply reservoir 49. Interposed in the conduit 47 is a pressure pump 51. A conduit 52 leads from the bleeder passageway 42 to the reservoir.

Figure 2:
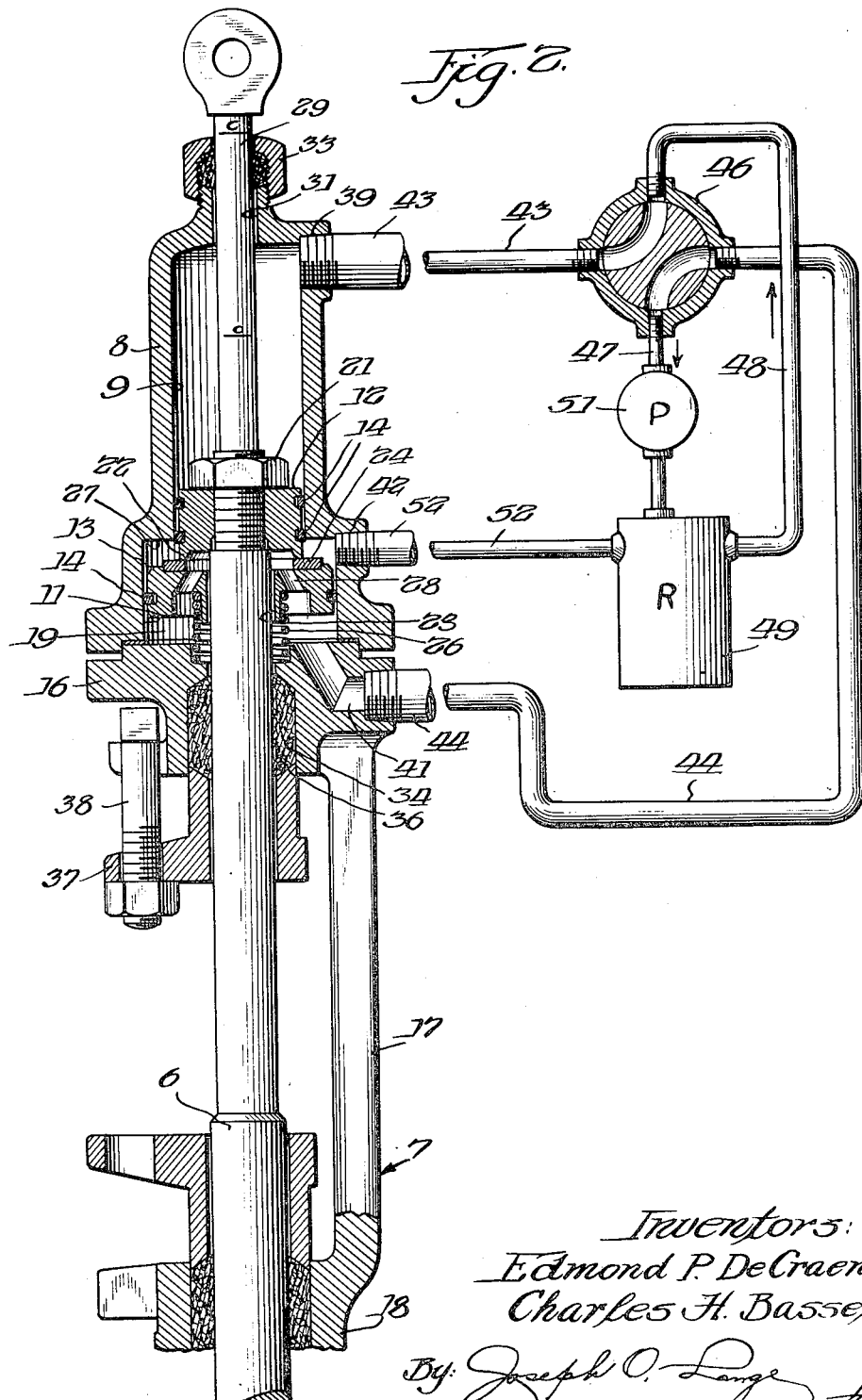
Fig. 2 is a view similar to Fig. 1 and in which the several parts are shown as positioned at the other end of the piston stroke (valve closed).

In the operation of the hydraulic booster thus described to close the valve, fluid under pressure created by the pump 51 is directed by the valve 46 through the conduit 43 into the upper end of the cylinder 8 to move the piston 12 toward the lower end of the cylinder and into engagement with the booster piston 13, as shown in Fig. 2.

In unseating and opening the valve, fluid under pressure is directed by the control valve 46 through the conduit 44 to the booster chamber 19 to raise the booster piston 13 which, in turn, acts against the sealing flange 22 to raise the piston 12. After the valve is unseated and the booster piston sealing member 24 has engaged the sealing shoulder 22, the fluid passes through the apertures 28 to raise the smaller piston 12 to its full open position.

While this invention has been shown in but a single form it is obvious to those skilled in the art that it is not so limited but is susceptible of various changes and modifications without departing from the spirit thereof or the scope of the appended claims.

We claim:

1. In a hydraulic operator, a cylinder, a booster chamber provided on one end of said cylinder, a stem mounted for reciprocable movement in said cylinder, an operating piston secured to said stem for actuating same, a booster piston for reciprocable movement in said booster chamber, passage means through the said booster piston communicating with the said cylinder, a seat provided on said booster piston, a seat provided on said cylinder for sealing engagement with said booster seat, a seat provided on said operating piston for sealing engagement with said booster seat when the booster piston seat is moved out of engagement with the cylinder seat, and yieldably resistant means for maintaining the booster piston seat in alternate sealing engagement with either the cylinder seat or the operating piston seat.

2. In a hydraulic operator, a cylinder, a booster chamber provided on one end of said cylinder, a stem mounted for reciprocable movement in said cylinder, an operating piston secured to said stem for actuating same, a booster piston for reciprocable movement in said booster chamber, passage means within the said booster piston communicating with the said cylinder, a seat provided on said booster piston, a seat provided on said cylinder for sealing engagement with said booster seat, a seat provided on said operating piston for sealing engagement with said booster seat when the booster piston seat is moved out of engagement with the cylinder seat, yieldably resistant means for maintaining the booster piston seat in alternate sealing engagement with either the cylinder seat or the operating piston seat, a bleeder passage provided for said booster chamber, and fluid passageways provided for directing fluid into and out of the cylinder and the booster chamber for actuating the operating piston and booster piston.

3. In a hydraulic operator, a cylinder, a booster chamber provided on one end of said cylinder, a stem mounted for reciprocable movement in said cylinder, an operating piston secured to said stem for actuating same, a booster piston for reciprocable movement in said booster chamber, passage means through the said booster piston communicating with the said cylinder, a seat provided on said booster piston, a seat provided on said cylinder for sealing engagement with said booster seat, a seat provided on said operating piston for sealing engagement with said booster seat when the booster piston seat is moved out of engagement with the cylinder seat, a compression spring for maintaining the booster piston seat in alternate sealing engagement with either the cylinder seat or the operating piston seat, a bleeder passage provided for said booster chamber, and fluid passageways provided for directing fluid into and out of the cylinder and the booster chamber for actuating the operating piston and booster piston.

4. In a hydraulic operator, a cylinder, a booster chamber provided on one end of said cylinder, a stem mounted for reciprocable movement in said cylinder, an operating piston secured to said stem for actuating same, a booster piston for reciprocable movement in said booster chamber, a seat provided on said booster piston, a seat provided on said cylinder for sealing engagement with said booster seat, a seat provided on said operating piston for sealing engagement with said booster seat when the booster piston seat is moved out of engagement with the cylinder seat, a compression spring for maintaining the booster piston seat in alternate sealing engagement with either the cylinder seat or the operating piston seat, a bleeder passage provided for said booster chamber, fluid passageways provided for directing fluid into and out of the cylinder and the booster chamber for actuating the operating piston and booster piston, and passages leading through the booster piston.

5. In a hydraulic operator, a cylinder, a booster chamber provided on one end of said cylinder, a stem mounted for reciprocable movement in said cylinder, an operating piston secured to said stem for actuating same, a booster piston for reciprocable movement in said booster chamber, a seat provided on said booster piston, a seat provided on said cylinder for sealing engagement with said booster seat, a seat provided on said operating piston for sealing engagement with said booster seat when the booster piston seat is moved out of engagement with the cylinder seat, a compression spring for maintaining the booster piston seat in alternate sealing engagement with either the cylinder seat or the operating piston seat, a bleeder passage provided for said booster chamber, fluid passageways provided for directing fluid into and out of the cylinder and the booster chamber for actuating the operating piston and booster piston, passages leading through the booster piston, a source of fluid under pressure, and means for selectively directing the fluid under pressure into cylinder and booster chamber for actuating the stem.

CHARLES H. BASSETT.
EDMOND P. DE CRAENE.

REFERENCES CITED

The following references are of record in the file of this patent:

UNITED STATES PATENTS

| Number | Name | Date |
|---|---|---|
| 2,055,815 | Dewey | Sept. 29, 1936 |
| 1,187,946 | Vincent | June 20, 1916 |
| 2,193,125 | Evans | Mar. 12, 1940 |
| 2,148,616 | Gruber | Feb. 28, 1939 |
| 2,329,044 | Gollmer | Sept. 7, 1943 |